United States Patent
Posey

(10) Patent No.: US 9,422,435 B2
(45) Date of Patent: Aug. 23, 2016

(54) SCRATCH AND STAIN RESISTANT COATINGS

(71) Applicant: PPG Industries Ohio, Inc., Cleveland, OH (US)

(72) Inventor: David Posey, Greensboro, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 146 days.

(21) Appl. No.: 13/750,321

(22) Filed: Jan. 25, 2013

(65) Prior Publication Data
US 2014/0212597 A1 Jul. 31, 2014

(51) Int. Cl.
| | | |
|---|---|---|
| C09D 7/12 | (2006.01) | |
| C09D 4/00 | (2006.01) | |
| B05D 3/00 | (2006.01) | |
| B05D 3/06 | (2006.01) | |

(52) U.S. Cl.
CPC ............. *C09D 7/1216* (2013.01); *B05D 3/00* (2013.01); *B05D 3/067* (2013.01); *C09D 4/00* (2013.01)

(58) Field of Classification Search
USPC ......... 522/79, 83, 80, 96, 113, 114, 120, 121, 522/178, 182, 173, 174; 428/500, 507, 511
See application file for complete search history.

(56) References Cited

U.S. PATENT DOCUMENTS

| | | | |
|---|---|---|---|
| 5,928,778 A * | 7/1999 | Takahashi et al. | ............ 428/323 |
| 6,699,586 B2 * | 3/2004 | Edelmann et al. | ............ 428/447 |
| 6,830,816 B2 * | 12/2004 | Mehnert et al. | ............ 428/423.1 |
| 6,833,186 B2 | 12/2004 | Perrine et al. | |
| 8,258,225 B2 | 9/2012 | Barkac et al. | |
| 2002/0137872 A1 | 9/2002 | Schneider et al. | |
| 2003/0153643 A1 | 8/2003 | Jin et al. | |
| 2005/0171227 A1 | 8/2005 | Weine Ramsey | |
| 2005/0234152 A1 | 10/2005 | Ramsey | |
| 2005/0249939 A1 * | 11/2005 | Barkac et al. | ................ 428/323 |
| 2011/0311807 A1 | 12/2011 | Jin et al. | |
| 2012/0142815 A1 | 6/2012 | Mirante et al. | |

FOREIGN PATENT DOCUMENTS

| | | |
|---|---|---|
| CN | 1554717 A | 12/2004 |
| CN | 101423678 A | 5/2009 |
| CN | 101555382 A | 10/2009 |
| CN | 101935496 A | 1/2011 |
| CN | 102516866 A | 6/2012 |
| CN | 102660189 A | 9/2012 |
| DE | 202007011524 U1 | 11/2007 |
| WO | WO 2009/155586 A1 | 12/2009 |

OTHER PUBLICATIONS

Product Information from Degussa: Aerosil 200 hydrophillic fumed silica. Jul. 2004. [online]. Retrived from <URL://http:www.aerosil.com.> . [Retrived on Sep. 28, 2014].*

The Quartz Corp.Product Bulletin for Minspar 10. (Mar. 2011). [online]. Retrived from internet <URL://httphttp://www.thequartzcorp.com/assets/file/Minspar_10_PDS.pdf>. [retrived on Sep. 30, 2014].*

Cytec Safety Data Sheet for Execryl 5129 (Aug. 2011). Retrieved online on [Jan. 8, 2015]. Retrieved from <URL:http://www.msds365.com/?free-msds-download=ebecryl-5129-radiation-curing-resins-2>.*

Product Guide from Allnex.. Radcure UV/EB Energy Curable Resins. (2014). online. Retrieved online on [Jan. 8, 2015]. Retrieved from Internet <URL:file:///C:/Users/smcclendon/Downloads/151014%20LowRes%20Radcure%20Product%20Guide%20AP.pdf>.*

ACEMATT HK125, data sheet from EVONIK Industries. no date. Retrieved online. Retrieved on Apr. 1, 2015. Retrieved from internet <URL//http://www.acematt.com/lpa-productfinder/page/productsbytext/detail.html?pid=2296&lang=en>.*

* cited by examiner

*Primary Examiner* — Sanza McClendon
(74) *Attorney, Agent, or Firm* — Justin P. Martinchek

(57) ABSTRACT

The present invention relates to a coating composition that provides improved scratch and stain resistance. The coating composition includes a curable film-forming resin having at least two multi-functional (meth)acrylates and a plurality of particles dispersed within the resin, said particles comprising (i) inorganic nanoparticles and (ii) wear resistant mineral particles. The wear resistant mineral particles have an average particle size of greater than 3.5 microns.

18 Claims, No Drawings

SCRATCH AND STAIN RESISTANT COATINGS

BACKGROUND OF THE INVENTION

1. Field of the Invention

The present invention relates to ultraviolet-curable coating compositions, as well as methods for their use, and the resulting scratch and stain resistant coating layers.

2. Description of Related Art

Wood and various types of composite materials such as laminate are often used as flooring, desks, and cabinetry in houses, and businesses. These materials are subjected to abrasive and damaging conditions from foot traffic and contact with heavy objects, especially in areas of high traffic (i.e., hallways, kitchens, and common areas). In order to protect these materials from scratches and stains, a protective topcoat layer can be applied to the surface.

In recent years, considerable efforts have been expended to develop coating compositions that can be used as anti-scratch and anti-stain coatings. However, coatings currently on the market do not fully protect against sundaes and stains. Accordingly, the is a need for coatings with enhanced scratch and stain resistance, and which also maintain the appearance of the materials that are coated.

SUMMARY OF THE INVENTION

The present invention is directed to a coating composition that includes a curable film-forming resin having at least two multi-functional (meth)acrylates and a plurality of particles dispersed within the resin, the particles comprising (i) inorganic nanoparticles and (ii) wear resistant mineral particles. The wear resistant mineral particles have an average particle size of greater than 3.5 microns.

The present invention is also directed to a method of coating a substrate with the coating compositions of the present invention. The method includes applying the composition over at least a portion of a substrate such as wood. After the coating composition is applied to at least a portion of the substrate, the composition is cured.

DESCRIPTION OF THE PREFERRED EMBODIMENT

For purposes of the following detailed description, it is to be understood that the invention may assume various alternative variations and step sequences, except where expressly specified to the contrary. Moreover, other than in any operating examples, or where otherwise indicated, all numbers expressing, for example, moieties in a general chemical formula and quantities of ingredients used in the specification an claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the Claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub mages subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

According to one embodiment of the present invention, a coating composition includes as curable-film forming resin comprising at least two multi-functional (meth)acrylates and a plurality of particles dispersed within the resin. The particles dispersed within the resin can include inorganic nanoparticles and wear resistant mineral particles. The wear resistant mineral particles have an average particle size of greater than 3.5 microns.

As mentioned above, the curable-film forming resin of the present invention includes at least two multi-functional (meth)acrylates. As used herein, the term "(meth)acrylate" refers to (meth)acrylate monomers, polymers, and oligomers. The multi-functional (meth)acrylates can independently be at least difunctional, trifunctional, tetrafunctional, pentafunctional, hexafunctional, and/or heptafunctional. However, it will be appreciated that the particular number of functional groups of each multi-functional (meth)acrylate will vary based on the desired properties of the final coating.

Non-limiting examples of (meth)acrylates that awe suitable for use with the present invention include urethane (meth)acrylates, epoxy (meth)acrylates, silicone (meth)acrylates, amine (meth)acrylates, amide (meth)acrylates, polysulfone (meth)acrylates, polyester acrylates, polyether (meth)acrylates, and vinyl (meth)acrylates. The multi-functional acrylates may be aromatic and/or aliphatic.

In one embodiment, the at least two multi-functional (meth)acrylates include a tetrafunctional (meth)acrylate and a hexafunctional (meth)acrylate. In certain embodiments, the hexafunctional (meth)acrylate is a hexafunctional aromatic urethane acrylate, which is commercially available from Rahn USA, Corp. under the trade name GENOMER 4622. In some embodiments, the tetrafunctional (meth)acrylate is ditrimethylolpropane tetra-acrylate (DITMPTA), which is commercially available from Sartomer.

The multi-functional (meth)acrylates can be present, collectively, in the coating compositions in an amount of at least 20 weight percent, such as in an amount of at least 50 weight percent, and in some embodiments, up to 75 weight percent, where the weight percent is based on total weight percent of the coating composition. In one embodiment, the coating composition of the present invention includes two multi-functional (meth)acrylates where one of the multi-functional (meth)acrylates is present in the coating composition in an amount between 0 and 20 weight percent and the second multi-functional (meth)acrylate monomer is present in the composition in an amount between 20 and 60 weight percent, the weight percent based on the total weight percent of the coating composition.

As mentioned previously, the present tion can also include a plurality of particles dispersed throughout the curable-film forming resin. The plurality of particles dispersed throughout the resin can include inorganic nanoparticles. As used herein, the term "nanoparticle" refers to particles having an average particle size of less than 1 micrometers (μm), such as less than 500 nanometers (nm), and in certain embodiments, less than 100 nm. As used herein, "average particle size" refers to the size of about 50 weight percent or more of the particles in a sample.

Non-limiting examples of inorganic nanoparticles suitable for use with the present invention include silica, alumina, and mixtures of silica and alumina. The silica can be in any suitable form, such as crystalline, amorphous, or precipitated. The alumina can be used in any of its forms, such as alpha, beta, gamma, delta, theta, tabular alumina, and the like and can be fused or calcined. Inorganic nanoparticles suitable for use with the present invention are commercially available. For instance, silica nanoparticles suitable for use with the present invention can be purchased from BASF Resins under the trade name LAROMER PO 9026.

The inorganic nanoparticles can be present in the coating compositions in an amount of at least 3 weight percent, such as in an amount of at least 10 weight percent, and in some embodiments, up to 12 weight percent, where the weight percent is based on total weight percent of the coating composition.

The particles dispersed throughout the resin can also include wear resistant min particles. As used herein, the term "wear resistant" refers to the ability of a material to withstand damage to its suffice. Non-limiting examples of wear resistant mineral particles that are suitable for use with the present invention include aluminum, aluminum oxide, silicon carbide, and boron carbide. Mixtures of any of the aforementioned particles can be used in the present invention as the wear resistant mineral particles. For example, in one embodiment, the wear resistant mineral particles include a mixture of silicon carbide and aluminum oxide.

Other types of mineral particles can also be used. However, the mineral particles should have a hardness value that provides superior mar and/or scratch resistance. The Mohs scale is an empirical scale of the hardness of minerals or mineral-like materials, and indicates the relative scratch resistance of the surface of a material. The original. Mobs scale consisted of the values ranging from 1 to 10, with talc having a value of 1 and diamond having a value of 10. The scale has recently been expanded from a maximum value of 10 to a maximum value of 15 to accommodate the addition of some synthetic materials. All of the Mobs hardness values discussed herein, however, are based upon the original 1 to 10 scale.

As noted above, the mineral particles should have a hardness value that provides superior mar and/or scratch resistance. Thus, according to one embodiment, the wear resistance mineral particles of the present invention have a Molls hardness of at least 6. In addition, in certain embodiments, the inorganic nanoparticles also have a Mohs hardness of at least 6.

The wear resistant mineral particles of the present invention can have an average particle size of greater than 3.5 microns, such as 5 microns, or 10 microns. In certain embodiments, the wear resistant mineral particles have an average particle size of up to 15 microns. It is appreciated that the particle size of the wear resistant mineral particles will be selected based on the desired properties of the final coating formed from the coating composition described herein.

The wear resistant mineral particles can be present, collectively, in the coating compositions of the present invention in an amount ranging from 1 and 15 weight percent, based on total weight percent of the coating composition. For example, the coating composition can include 3 weight percent aluminum oxide and 3 weight percent silicon carbide, thereby collectively producing a total of 6 weight percent of wear resistant mineral particles. The weight percent is based on total weight percent of the coating composition.

It was surprisingly found that the combination of at least two multi-functional (meth)acrylates, inorganic nanoparticles, and wear resistant mineral particles with an average particle size of greater than 3.5 microns, as described in detail above, produced a non-brittle hard coating with high crosslink density and which exhibited superior scratch and stain resistance while maintaining film clarity.

The coating compositions of the present invention can be cured by radiation. In certain embodiments, the compositions are cured by ultraviolet (UV) light. Accordingly, in certain embodiments, the coating compositions of the present invention will crosslink upon exposure to UV radiation to produce a film. Any suitable source of ultraviolet light having a wavelength ranging from about 180 to about 400 nanometers may be employed. Suitable sources of ultraviolet light are widely available and, include, for example, mercury arcs, carbon arcs, low pressure mercury lamps, medium pressure lamps, high pressure mercury lamps, swirl-flow plasma arcs, and ultraviolet light emitting diodes.

When UV light is used to cure the compositions of the invention, the compositions typically contain a photopolymerization initiator (and/or photopolymerization sensitizer). Photoinitiators and photosensitizers are generally known in the art. Non-limiting examples of photoinitiators/photosensitizers suitable for use with the present invention include isobutyl benzoin ether, mixtures of butyl isomers of butyl *benzoin* ether, α,α-diethoxyacetophenone, α,α-dimethoxy-α-phenylacetophenone, benzophenone, anthraquinone, thioxanthone, and phosphine oxides. Photoinitiators suitable for use with the present invention can also be purchased commercially, such as the photoinitiator commercially available from BASF Resins under the trade name DAROCUR 1173. Other examples of photoinitiators and photosensitizers that are suitable for use with the present invention can be found in U.S. Pat. No. 4,017,652, which is incorporated by reference herein in its entirety. UV stabilizers can also be added including, but not limited to, benzotriazoles, hydrophenyl triazines and hindered amine light stabilizers, for example, those commercially available from Ciba Specialty Chemicals in their TINUVIN line.

Other additives standardly used in the art can also be used in the present compositions. This includes organic solvents such as esters, for example, n-butyl acetate, ethyl acetate and isobutyl acetate; ether alcohols, such as ethylene glycol monoethyl ether, ethylene glycol monobutyl ether, propylene glycol monomethyl ether, dipropylene glycol monoethyl ether, propylene glycol monoethylether acetate, ethylene glycol monoethylether acetate, dipropylene glycol monoethylether acetate and diethylene glycol monoethylether acetate; ketones, such as methyl ethyl ketone, methyl n-butyl ketone and methyl isobutyl ketone; lower alkanols containing 2 to 4 carbon atoms, such as ethanol, propanol, isopropanol and butanol; and aromatic hydrocarbons, such as xylene, toluene, and naphtha.

Other additives can also be used, including, but not limited to, rheology modifiers, flow additives, waxes for flow and wetting, flow control agents, air release agents, and gloss control additives. Diluting monomers can also be added to the coating of the present invention. Non-limiting examples of diluting monomers suitable for use with the present invention include 1,6-hexanediol diacrylate, n-vinyl-2-pyrollidone, and tripropylene glycol diacrylate.

The present invention is also directed to a method of coating a substrate with the scratch and stain resistant coating composition described herein. The method includes applying the coating composition over at least a portion of a substrate. The coating composition can be applied in liquid form. The coating compositions of the present invention can be applied by any conventional means, including spraying, curtain coating, dip padding, roll coating, vacuum coating, and brushing. Any substrate can be coated with the present compositions, including, for example, wood flooring, wood veneer, flexible plastic including vinyl flooring, and the like. Wood and wood veneer substrates other than flooring can also be treated according to the present invention, such as desks, table tops, cabinetry, and the like.

After the coating composition is applied to at least a portion of the substrate, the composition is cured. In one embodiment, the coating composition is cared with UV light. The coating of the present invention can be applied to the substrate at certain thicknesses. For example, and without limitation, the coating compositions of the present invention can be applied to the substrate at a thickness of up to 20 microns, such as at 10 microns.

The coating composition can also be applied as a topcoat over a first coating layer. Thus, in certain embodiments, a number of different layers may be applied to the substrate. In addition to the coating formed from the composition of the present invention, additional coating layers that can be applied to the substrate can include, for example, a basecoat, a primer, a stain coating, a sealer, and an abrasion resistant sealer. Any of the coating compositions of the present invention can be applied over these additional coating layer as a topcoat. Accordingly, the present invention is further directed to a multi-layer coating system that includes at least the coating layer formed from any of the aforementioned coating compositions of the present invention and at least one additional coating layer.

To determine whether improved scratch and stain resistance was obtained by the compositions of the present invention, two formulations were made with one of the compositions having all the components of the present invention and the other not having at least one of the components or parameters of the present invention. The coatings can be tested for scratch and stain resistance by any means standard in the art, such as those described in the Examples section below. Even a small improvement in any of these tests constitutes an improvement according to the present invention.

EXAMPLES

The following Examples are presented to demonstrate the general principles of the invention. Example 1 describes the preparation of a composition of the present invention. Example 2 is a comparative example that describes the preparation of an analogous composition that does not contain at least one of the materials and/or parameters of the composition of Example 1. Ail amounts listed are described in parts by weight, unless otherwise indicated. The invention should not be considered as limited to the specific Examples presented.

Example 1

A coating composition according to the present invention was prepared from the following mixture of ingredients as described below:

TABLE 1

| Ingredient | Mass (Total of 100) |
| --- | --- |
| BYK-361 n[1] | 0.50 |
| BYK-a 530[2] | 0.15 |
| TEGO AIREX 920[3] | 0.15 |
| DISPERBYK-161[4] | 0.76 |
| SYLOID RAD 2105[5] | 3.80 |
| Silica hp220[6] | 3.80 |
| ALODUR aluminum oxide ZWSK 800[7] | 3.00 |
| Microgrit green silicon carbide[8] | 3.00 |
| LAROMER PO 9026[9] | 15.00 |
| Benzophenone[10] | 1.00 |
| DAROCUR 1173[11] | 3.00 |
| Genomer 4622[12] | 35.66 |
| DITMPTA[13] | 15.74 |
| 1,6-hexanediol diacrylate[14] | 14.44 |

[1]Leveling additive, commercially available from BYK.
[2]Silicone and polymeric defoamer, commercially available from BYK.
[3]Deaerator for radiation-curing coating systems, commercially available from Evonik Industries.
[4]Wetting and dispersing additive, commercially available from BYK.
[5]Treated amorphous synthetic silica, commercially available from GRACE Davison.
[6]Organically treated silica gel, commercially available from PQ Corporation.
[7]Aluminum oxide, commercially available from Treibacher Schleifmittel.
[8]Silicon carbide.
[9]Acrylate resin with 50% nano-scale silica, commercially available from BASF Resins.
[10]Photoinitiator.
[11]Photoinitiator, commercially available from BASF Resins.
[12]Hexafunctional aromatic urethane acrylate, commercially available from Rahn USA Corp.
[13]Ditrimethylolpropane tetraacrylate, commercially available from Sartomer.
[14]Diluting monomer.

GENOMER 4622, DITMPTA, and 1,6-hexanediol diacrylate were placed in a stainless steel vessel. The ingredients were then agitated with a cowls blade. Under regular agitation, BYK-a 530, TEGO AIREX 920, and DISPERBYK-161 were added to the vessel. The agitation was increased to high speed, and SYLOID RAD 2105 and Silica hp220 were added to the vessel. The ingredients were then mixed for 15 minutes. Then, under agitation, BYK-361 n, benzophenone, DAROCUR 1173, ALODUR aluminum oxide ZWSK 800, microgrit green silicon carbide, and LAROMER PO 9026 were added to the vessel. Finally, all the ingredients were mixed for 30 minutes.

Example 2

A coating composition was prepared from the following mixture of ingredients as described below:

TABLE 2

| Ingredient | Mass (Total of 100) |
| --- | --- |
| TEGO AIREX 920[1] | 0.04 |
| CERAFLOUR 950[2] | 0.20 |
| SST-4[3] | 0.48 |
| ACEMATT OK 412[4] | 5.55 |
| ALODUR aluminum oxide ZWSK 800[5] | 4.14 |
| Microgrit green silicon carbide[6] | 3.10 |
| IRGACURE 184/GENOCURE CPK[7] | 2.80 |
| LAROMER PE 55 F[8] | 35.19 |
| EBERCRYL, 7100[9] | 1.62 |
| Benzophenone[10] | 0.93 |
| Tripropylene glycol diacrylate[11] | 5.23 |
| GENOMER 4622[12] | 10.48 |

TABLE 2-continued

| Ingredient | Mass (Total of 100) |
|---|---|
| Epoxy acrylate 10-620/tp20[13] | 13.75 |
| 1,6-hexanediol diacrylate[14] | 16.42 |

[1]Deaerator for radiation-curing coating systems, commercially available from Evonik Industries.
[2]Micronized wax, commercially available from BYK.
[3]Micronized wax, commercially available from Shamrock Technologies, Inc.
[4]Treated amorphous synthetic silica, commercially available from Evonik Industries.
[5]Aluminum oxide, commercially available from Treibacher Schleifmittel.
[6]Silicon Carbide.
[7]Photoinitiator, commercially available from BASF Resins and Rahn USA Corp.
[8]Polyester acrylate resin, commercially available from BASF Resins.
[9]Acrylated amine, commercially available from Cytec.
[10]Photoinitiator.
[11]Diluting monomer.
[12]Hexa-functional aromatic urethane acrylate, commercially available from Rahn USA Corp.
[13]Bisphenol A epoxy diacrylate in 20% TPGDA, commercially available from Rahn USA Corp.
[14]Diluting monomer.

GENOMER 4622, EBECRYL 7100, Epoxy acrylate 10-620/tp20, 1,6-hexanediol diacrylate, and LAROMER PE 55 F were placed in a stainless steel vessel. The ingredients were then agitated with a cowls blade. Under high speed agitation, ACEMATT OK 412, CERAFLOUR 950, and SST-4 were added to the vessel. The ingredients were then mixed for 15 minutes. Then, under agitation, tripropylene glycol diacrylate, benzophenone, IRGACURE 184/GENOCURE CPK, TEGO AIREX 920, ALODUR aluminum oxide ZWSK 800, and microgrit green silicon carbide were added to the vessel. Finally, all the ingredients were mixed for 30 minutes.

The coating formed from the compositions of Examples 1 and 2 were tested for adhesion to a wood panel according to ASTM D3359 Test Method B (Crosshatch Adhesion Test). In accordance with ASTM D3359, a crosshatch pattern was cut through the films formed on the wood panels. A pressure-adhesive tape was then applied over the crosshatch cut. After about 90 seconds, the tape was removed and the panels were inspected for removal of the coatings. The adhesion was assessed on a 0 to 5 scale with 0 being complete failure and 5 constituting excellent adhesion. The coatings formed from the compositions of Examples 1 and 2 exhibited an adhesion of 5. Thus, the coatings formed from the compositions of Examples 1 and 2 both exhibit superior adhesion.

The compositions prepared in Examples 1 and 2 were first tested for scratch resistance using the Steel Wool Scratch Test. In accordance with the Steel Wool Scratch Test, wood panels coated with the compositions of Examples 1 and 2 were subjected to abrasion from three different steel wool pads and a SCOTCH BRITE pad. The four pads were a #3 Coarse steel wool pad, a #1 Medium steel wool pad, a #000 Extra Fine steel wool pad, and a maroon SCOTCH BRITE pad. Each pad was slid across the wood panels for 20 repetitions where one repetition is performed by sliding the pad across the entire panel and then back following the same track. The panels were evaluated for scratches on a scale of 0 to 5 with 0 representing no lines/scratching and 5 representing obvious lines/scratching with de-glossing. The panels were also evaluated for discoloration on a scale of 0 to 5 with 0 representing no color change and 5 representing strong discoloration. The coatings formed from the compositions of Examples 1 and 2 both exhibited a scratch rating of 0 and discoloration of 0. Therefore, according to the Steel Wool Scratch Test, the coatings formed from the composition of Examples 1 and 2 both exhibited superior scratch resistance.

To further evaluate the scratch resistance coatings formed from the compositions of Examples 1 and 2, coated wood panels were subjected to a Pot Scrubber Scratch Test. In the Pot Scrubber Scratch Test, a SCOTCH BRITE pad (Beige SCOTCH BRITE #7440 (Type A, Medium)) was set underneath a 12.5 lb. weight, with the unprinted side placed on the panel. A linear abrasion tester was used to oscillate the pad across the panel for a set number of cycles. The unit was set to a speed of 70. The unit ran for 10 cycles, 50 cycles, and 100 cycles. Each board was evaluated for deep and shallow scratches after the 10, 50, and 100 cycles. The performance of each coating was reported on a scale of 0 to 5 with 0 representing no scratching and 5 representing severe scratching. As shown in Table 3, the coating formed firm the composition of Example 1 (coating of the present invention) exhibited better scratch resistance than the coatings formed from the composition of Example 2 for both deep and shallow scratches after 10, 50, and 100 cycles.

TABLE 3

| Deep/Shallow Scratch Rating | Example 1 | Example 2 |
|---|---|---|
| 10 cycle Rating (Deep Scratch) | 0.5 | 2.0 |
| 10 cycle Rating (Shallow Scratch) | 0.0 | 1.0 |
| 50 cycle Rating (Shallow Scratch) | 0.0 | 3.0 |
| 100 cycle Rating (Deep Scratch) | 2.0 | 3.0 |
| 100 cycle Rating (Shallow Scratch) | 2.0 | 3.0 |

The coatings formed from the compositions of Examples 1 and 2 were tested for stain resistance on wood panels according to ASTM D1308. In accordance with ASTM D1308, an eyedropper was used to place 2-3 drops of each of the following materials onto the wood panels: yellow mustard, iodine tincture (2%), black RIT dye solution, red food coloring, brown shoe polish, and a nail polish remover. Alter the materials were applied to the wood panels, a 1 oz. plastic medicine cup was placed over each material. After 6 hours, the plastic medicine cup was removed and the materials were wiped with a paper towel. The panels were then assessed for stains on a scale of 0 to 5 with 0 representing no staining and 5 representing severe staining. As shown in Table 4, the coating formed from the composition of Example 1 (coating composition of the present invention) exhibited better stain resistance than the coating formed from the composition of Example 2.

TABLE 4

| Staining Materials | Example 1 | Example 2 |
|---|---|---|
| Mustard (Stain Rating) | 0 | 1 |
| Iodine (Stain Rating) | 0.5 | 2 |
| Black RIT dye (Stain Rating) | 0 | 1 |
| Red Food Color (Stain Rating) | 0 | 1 |
| Brown Shoe Polish (Staing Rating) | 0 | 0 |
| Nail Polish Remover (Stain Rating) | 0 | 0 |

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. A coating formed from a coating composition comprising:
   a curable film-forming resin comprising at least two multi-functional (meth)acrylates, wherein at least a first multi-functional (meth)acrylate is at least hexafunctional and at least a second multi-functional (meth)acrylate is at least tetrafunctional; and
   a plurality of non-reactive, discrete, and separate particles dispersed within the resin, said particles comprising (i) inorganic nanoparticles and (ii) wear resistant mineral particles,
   wherein the wear resistant mineral particles have an average particle size of greater than 3.5 microns, and the inorganic nanoparticles comprise silica, alumina, or a mixture thereof, and the silica nanoparticles comprise crystalline, amorphous, and/or precipitated silica, and
   wherein the coating formed from the coating composition comprises a plurality of non-reactive, discrete, and separate particles, said particles comprising (i) the inorganic nanoparticles and (ii) the wear resistant mineral particles.

2. The coating of claim 1, wherein the inorganic nanoparticles are present in the coating composition in an amount of at least 3 weight percent, based on total weight of the coating composition.

3. The coating of claim 1, wherein the wear resistant mineral particles comprise aluminum, aluminum oxide, silicon carbide, boron carbide, or mixtures thereof.

4. The coating of claim 1, wherein the wear resistant mineral particles comprise silicon carbide and aluminum oxide.

5. The coating of claim 1, wherein the wear resistant mineral particles are present in the coating composition in an amount between 1 and 15 weight percent, based on total weight of the coating composition.

6. The coating of claim 1, wherein the wear resistant mineral particles have an average particle size between 3.5 and 15 microns.

7. The coating of claim 1, wherein the multi-functional (meth)acrylate monomers are present in the coating composition in an amount between 20 and 75 weight percent, based on total weight of the coating composition.

8. The coating of claim 1, wherein the coating composition further comprises a photoinitiator.

9. The coating of claim 1, wherein the coating composition further comprises a diluting monomer.

10. A method of coating a substrate with a scratch and stain resistant coating composition, the method comprising:
   (a) applying a coating composition over at least a portion of a substrate, the coating composition comprising:
      a curable film-forming resin comprising at least two multi-functional (meth)acrylates, wherein at least a first multi-functional (meth)acrylate is at least hexafunctional and at least a second multi-functional (meth)acrylate is at least tetrafunctional; and
      a plurality of non-reactive, discrete, and separate particles dispersed within the resin, said particles comprising (i) inorganic nanoparticles and (ii) wear resistant mineral particles, wherein the wear resistant mineral particles have an average particle size of greater than 3.5 microns, and
      wherein the inorganic nanoparticles comprise silica, alumina, or mixtures thereof, wherein the silica nanoparticles comprise crystalline, amorphous, and/or precipitated silica; and
   (b) curing the coating composition to form a coating comprising a plurality of non-reactive, discrete, and separate particles, said particles comprising (i) the inorganic nanoparticles and (ii) the wear resistant mineral particles.

11. The method of claim 10, wherein the coating composition is applied at a coating thickness of up to 20 microns.

12. The method of claim 10, wherein the coating composition further comprises a photoinitiator.

13. The method of claim 10, wherein the curing is accomplished with ultraviolet (UV) light.

14. The method of claim 10, wherein the coating composition is applied as a topcoat over a first coating layer.

15. The method of claim 10, wherein the wear resistant mineral particles comprise aluminum, aluminum oxide, or a mixture thereof.

16. The method of claim 10, wherein the substrate comprises wood.

17. A coating formed from a coating composition comprising:
   a curable film-forming resin comprising at least two multi-functional (meth)acrylates, wherein at least a first multi-functional (meth)acrylate is at least hexafunctional and at least a second multi-functional (meth)acrylate is at least tetrafunctional; and
   a plurality of non-reactive, discrete, and separate particles dispersed within the resin, said particles comprising (i) inorganic nanoparticles and (ii) wear resistant mineral particles,
   wherein the wear resistant mineral particles have an average particle size of greater than 3.5 microns, and comprise silicon carbide and aluminum oxide, and
   wherein the coating formed from the coating composition comprises a plurality of non-reactive, discrete, and separate particles, said particles comprising (i) the inorganic nanoparticles and (ii) the wear resistant mineral particles.

18. A coating formed from a coating composition comprising:
   a curable film-forming resin comprising at least two multi-functional (meth)acrylates, wherein at least a first multi-functional (meth)acrylate is at least trifunctional and at least a second multi-functional (meth)acrylate is at least pentafunctional; and
   a plurality of non-reactive, discrete, and separate particles dispersed within the resin, said particles comprising (i) inorganic nanoparticles and (ii) wear resistant mineral particles,
   wherein the wear resistant mineral particles have an average particle size of greater than 3.5 microns, and the inorganic nanoparticles comprise silica, alumina, or a mixture thereof, wherein the silica nanoparticles comprise crystalline, amorphous, and/or precipitated silica, and
   wherein the coating formed from the coating composition comprises a plurality of non-reactive, discrete, and separate particles, said particles comprising (i) the inorganic nanoparticles and (ii) the wear resistant mineral particles.

* * * * *